(12) United States Patent
Marsh

(10) Patent No.: US 6,467,787 B1
(45) Date of Patent: Oct. 22, 2002

(54) ANGULARLY-ADJUSTABLE STEERING SYSTEM FOR STABILIZING AND ENHANCING MANEUVERS PERFORMED WITH SNOWMOBILES AND ALL-TERRAIN-VEHICLES

(75) Inventor: William C. Marsh, 808 "A" Caroline Ave., Mount Shasta, CA (US) 96067

(73) Assignee: William C. Marsh, Redding, CA (US)

( * ) Notice: Subject to any disclaimer, the term of this patent is extended or adjusted under 35 U.S.C. 154(b) by 0 days.

(21) Appl. No.: 09/544,840

(22) Filed: Apr. 6, 2000

(51) Int. Cl.[7] ................................................ B62M 9/00
(52) U.S. Cl. ...................... 280/279; 180/182; 74/551.1; 74/551.3; 74/551.7
(58) Field of Search ............................... 180/182, 184; 280/263, 279; 74/551.1, 551.2, 551.3, 551.5, 551.7, 551.8

(56) References Cited

U.S. PATENT DOCUMENTS

| | | | | | |
|---|---|---|---|---|---|
| 2,438,657 A | * | 3/1948 | Dufaux | ...................... | 74/551.5 |
| 3,583,507 A | * | 6/1971 | Trautwein | ................... | 180/190 |
| 3,779,326 A | * | 12/1973 | Trautwein | ................... | 180/190 |
| 4,420,989 A | * | 12/1983 | Finkle | ...................... | 74/551.2 |
| 4,619,341 A | * | 10/1986 | Davis | ........................ | 74/551.8 |
| 4,896,559 A | * | 1/1990 | Marier et al. | ................ | 180/182 |
| 5,253,544 A | * | 10/1993 | Allsop et al. | ................ | 280/279 |
| 5,357,826 A | * | 10/1994 | Morrone | ..................... | 74/531.3 |
| 5,456,135 A | * | 10/1995 | Li | ............................. | 74/551.7 |
| 6,234,042 B1 | * | 5/2001 | An | ............................. | 74/551.5 |

FOREIGN PATENT DOCUMENTS

FR 2469342 * 5/1981 ................. 180/210

* cited by examiner

Primary Examiner—Daniel G. DePumpo

(57) ABSTRACT

An angularly-adjustable steering system is provided for an off-road vehicle such as a snowmobile or an ATV. The steering system employs a modular handlebar-angling mechanism interfaced between the steering column and the handlebar apparatus of the steering system. The angling mechanism operates by pivotal mechanics to enable a user to position the handlebar apparatus of the steering system to any desired angle of tilt along a radial tilt range, and then to lock the apparatus into position using a cable-assisted lever or other mechanical control. The steering system is utilized in side-hilling and other difficult maneuvers for the purpose of improving stabilization of the vehicle over sloping terrain, improving the balance of a user operating the vehicle from a running-board position, and decreasing muscular strain on the user.

9 Claims, 6 Drawing Sheets

ANGULARLY-ADJUSTABLE STEERING SYSTEM FOR STABILIZING AND ENHANCING MANEUVERS PERFORMED WITH SNOWMOBILES AND ALL-TERRAIN-VEHICLES

FIELD OF THE INVENTION

The present invention is in the field of off-road recreational vehicles and pertains more particularly to methods and apparatus for stabilizing maneuverability of an off-road vehicle such as a snow mobile and improving balance and leveraging capability for a user operating such a vehicle.

BACKGROUND OF THE INVENTION

Two of the more popular off-road recreational vehicles are the all-terrain-vehicle (ATV) and the snowmobile. There are obvious differences in the types of terrain where these vehicles are used, which is evident in the differences in their constructions. For example, a snowmobile is a rear-tracked vehicle with two front skis adapted for maneuvering over various types or conditions of snow-pack. An ATV is typically a motor-driven, four-wheeled vehicle adapted for maneuvering over rough, muddy or sandy terrain.

In spite of obvious differences in method of propulsion and types of terrain traveled, there are a few commonalties between these two types of off-road vehicles. A major similarity is in the method and apparatus used in steering, throttle control, and breaking apparatus of such vehicles. For example, both types of vehicles support crossbar handles wherein a throttle control typically is placed near the end of the right bar of the handlebar and a vehicle breaking control typically is near the end of the left bar of the handlebar. The cross-configuration of the handlebar and the location of both throttle control and breaking control is consistent with supporting the type of maneuvering required in the operation and control of these otherwise very different vehicles.

Both of the above-described vehicles support column steering apparatus connected to front steering members. For a snowmobile, the front steering member acts to steer the skis. In an ATV, the front steering member acts to control the front wheels. Breaking acts to slow or stop the rear track of a snowmobile, while slowing or stopping the rear wheels of an ATV.

Another similarity between the above-described vehicles is that both support running boards or platforms located on either side of their chassis for the purpose of allowing a user to dismount from the seat area and to stand on a side running board for balance and weight shifting purposes during certain steering maneuvers. A maneuver common to both ATVs and snowmobiles, wherein standing on a side or running board is applicable, is termed side-hilling in the art. Side-hilling involves maneuvering the vehicle laterally across sloping terrain in either direction lateral to the slope without having the vehicle inadvertently turn downward toward the direction of the slope against the intent of a user.

A common problem associated with side-hilling is that both ATVs and snowmobiles naturally lend to turning downhill against the wishes of a user due to forces of gravity which take into account the weight of the vehicle (approx. 600 lbs.) and, the angle of the slope. The problem becomes more acute at greater angles of slope. In an attempt to off-set this down hill tendency, a user typically stands on the uphill-side running-board to obtain a shift of weight to the uphill side, which acts to reduce the chance of roll-over and reduces muscle strain on a user attempting to hold a slight upward steering position with respect to the position of the handlebars.

Particularly with snowmobiling, which will be the main focus of this specification hereinafter, it is more difficult to side-hill in the direction in which the hill slopes down to the right of the user. One obvious problem is the standard location of the throttle (right extension of handle), which makes it difficult to get an adequate weight shift toward the uphill side of the vehicle. Other factors come into play such as the pack condition of the snow and the bite achieved by the tracked portion of the vehicle and the skis. These factors are combined with the angle of the slope, the weight of the vehicle, and the balance capability and strength of a user. Some of the above-mentioned factors (condition of snow) cannot be predicted by a user until a side-hill maneuver is well underway. With all factors taken into account, the prior art construction of snowmobile handlebars and location of the throttle remains a serious impediment to successful side-hilling in either direction.

The above-described problem is well recognized in the art and snowmobile manufacturers have offered after-market solutions in an attempt to reduce the effects of the problem for users. One of these solutions involves adding a half-hoop grab-handle to the handlebar at a position near the "T" portion of the bar. A grab-handle allows a user to get more weight shifted toward the uphill side of the snowmobile by allowing the user to grip a center grab-bar instead of the down-slope-extending end of the stock handlebar. Thereby, a user may lean out further when standing on a running board. A problem with this solution is that a user's hands are placed much closer together on the handlebar when utilizing a grab-bar. Therefore, a user experiences a significant reduction of balance and leverage-ability to control steering. The above problem is compounded by the location of the throttle (right extension of bar), which prevents a user from using his right hand to grasp the grab-bar when side-hilling. Hence, difficulty of side-hilling wherein the slope angles down to the right of a user is not reduced by addition of a grab-bar.

Some manufactures have equipped handlebars with a dual throttle-control (one at both handlebar-extension ends) so that a user may utilize a grab-bar when side-hilling in either direction and still have a hand on a throttle control. However, a left throttle control is very awkward to use in actual practice, and the balance impediment caused by a close-together placement of a user's hands as well as a reduction in leverage capability for steering remains a tradeoff.

What is clearly needed is a method and apparatus that would enable a user to get maximum weight-shift toward the upside of a hill during a side-hilling maneuver in either direction without sacrificing balance or steering leverage, and without having to use an additional throttle control or an added grab-bar. Such a method and apparatus would greatly improve a user's capacity to maneuver a snowmobile or other similar off-road vehicle when side-hilling and when performing a host of other maneuvers.

SUMMARY OF THE INVENTION

In a preferred embodiment of the present invention an angularly-adjustable steering system for a vehicle is provided, comprising a steering column connected to a lower steering member for enabling control of steering direction of the vehicle; a handlebar apparatus for enabling user-applied direction for steering the vehicle; and a bar-angling mechanism for enabling angular adjustment of the handlebar apparatus, the bar angling mechanism fixedly adjoined to the handlebar apparatus at one end, and fixedly adjoined to the steering column at the other end, such that a user gripping the handlebar apparatus may position the handlebar apparatus to a desired angle of tilt by virtue of pivotal mechanics of the bar-angling mechanism. The steering system is particularly adaptable to a snowmobile in one preferred embodiment, and to an all-terrain vehicle (ATV).

In one embodiment the bar-angling mechanism utilizes at least one bi-directional, linear locking-device for locking and unlocking the position of the handlebar apparatus. In another the bar-angling mechanism is spring loaded and is unlocked and locked by operating an external control lever.

In another aspect of the invention a mechanism for providing angular adjustment capability to a vehicle steering system is provided comprising an upper mounting-plate fixedly adjoined to a handlebar apparatus; a lower mounting plate fixedly adjoined to a steering column; a pivotal mount for connecting the upper mounting-plate to the lower mounting-plate; at least one spring-retention rod pivotally mounted to the upper-mounting plate and supporting a spring compressed against the lower mounting-plate and against the end of the rod; and at least one locking-unlocking device for freeing or restricting movement of the connected handlebar apparatus along a tilt range. In one embodiment free angular movement of the handlebar apparatus is resisted by spring compression. In another embodiment the locking device is a bi-directional, linear locking-device. The linear locking device may be lever actuated and controlled by an external, user-operated, cable-assisted lever.

In one embodiment at least one linear locking device is adapted for spring retention and is used in place of at least one spring retention rod.

In yet another aspect of the invention a method for adjusting the angular position of a handlebar apparatus connected to a vehicle steering system is provided, comprising the steps of (a) activating an external control to unlock a bar-angling mechanism; (b) tilting a connected handlebar apparatus to a desired position along a vertical range of tilt; and (c) locking the bar-angling mechanism through release-activation of the external control.

In the method, in step (a) and (b), the external control may be a user-operated, cable-assisted lever. The method applicable to snowmobiles and all-terrain vehicles.

In embodiments of the present invention taught in enabling detail below, for the first time a mechanism is provided the art alowing a user of a snowmobile or ATV to efficiently and safely maintain operation on hillsides.

BRIEF DESCRIPTION OF THE DRAWING FIGURES

DESCRIPTION OF THE PREFERRED EMBODIMENTS

As was described in the background section, side-hilling is one particular maneuver wherein it is difficult to maintain balance and adequate leverage (torque) for steering. For example, a snowmobile involved in side-hilling tends to turn down hill against the intent of a user.

Figure 1:
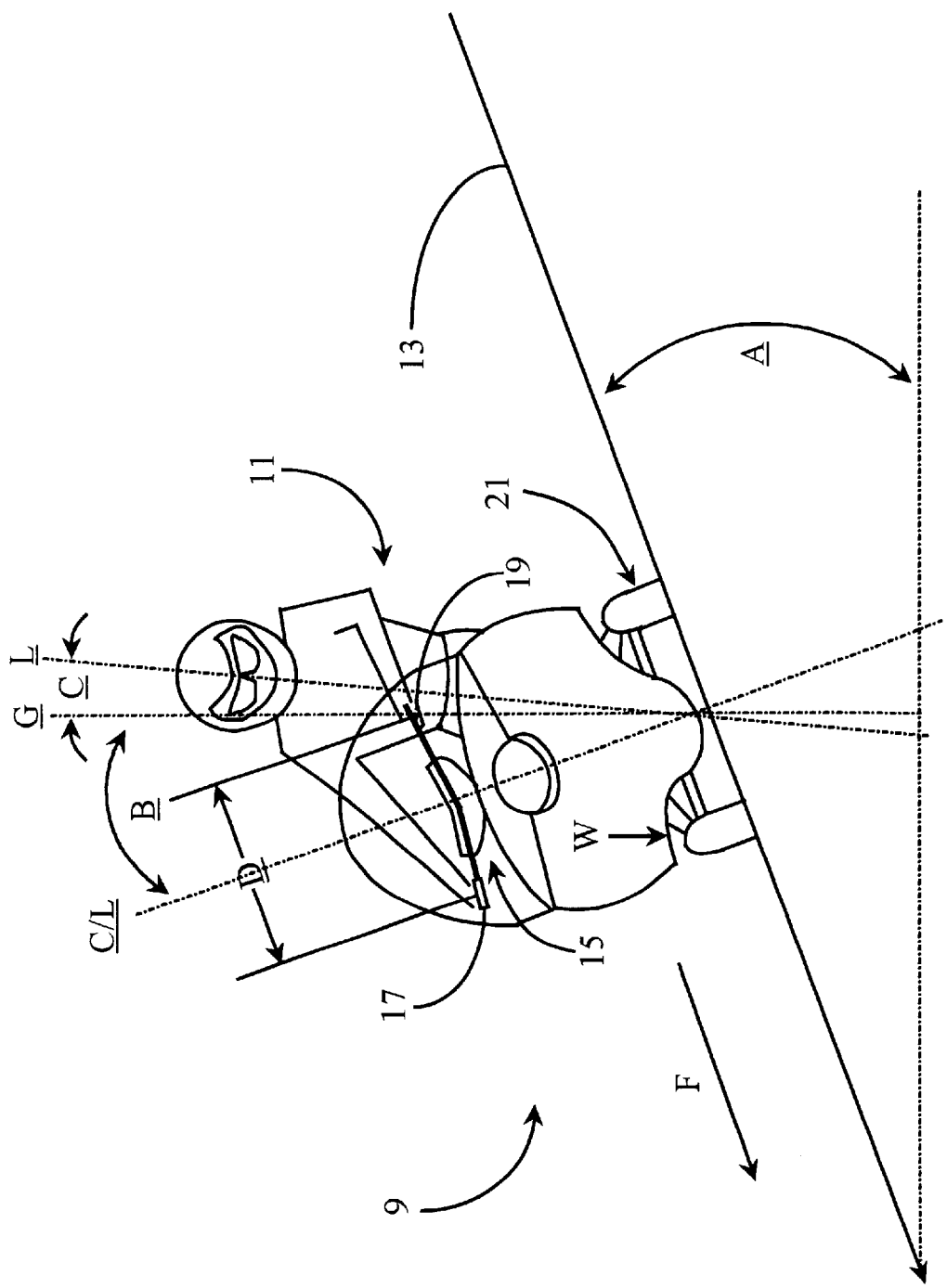
FIG. 1 is an overview of a rider on a snowmobile doing a side-hilling maneuver using a rigid steering system according to prior art.

FIG. 1 is an overview of a rider on a snowmobile doing a side-hilling maneuver using a rigid steering system according to prior art. A snowmobile 9 ridden by a user 11 is illustrated in a side-hilling maneuver on a slope 13. In this example, a slope-angle represented herein by the letter A may be assumed to be approximately 30 degrees. 30 degrees represents a workable slope angle and is illustrated for exemplary purposes only.

Snowmobile 9 has a rigid handlebar 15 adapted with a throttle control 17 and a vehicle-braking control 19 as is typical of prior art snowmobiles. User 11 is not sitting on a snowmobile seat, rather, he or she is standing in a crouched position on an available left-side running-board (from the rider's viewpoint), which is not visible in this example because of the front chassis of snowmobile 9. A pair of skis 21 supports the forward weight of snowmobile 9 and a part of the weight of user 11 on slope 13.

A force F represents a variable force of down-slope gravitational pull acting on snowmobile 9 against slope 13 while engaged in lateral side-hilling. The exact value of F is a function of several variables including the combined weight of snowmobile 9 and user 11 (W), the angle of slope (A), and various snow-pack conditions that may be present. Generally speaking F will be greater with increases in A and/or W.

A line of gravity G represents a constant vertical line of gravity in relationship to A (slope angle). For example, as A is increased to 90 degrees G and A eventually become one, such that any slope is eliminated creating a complete vertical drop. It is recognized in the art of hill-side maneuvers, especially in hiking or hill climbing that one should keep his or her body in line with G in order to maintain maximum footing. In snowmobiling it is desired to pull or lean toward the uphill side of snowmobile 9 in an attempt to lessen an angle, represented herein by the letter B, from the vertical centerline of snowmobile 9, illustrated as C/L, to G (line of gravity).

It can be seen in this prior art example that user 11 is leaning uphill, the user's body position forming a line L representing the angle of lean past G. The value of this angle is represented herein by the letter C. Force F causes most of the combined weight W to be concentrated at the ski on the down-sloping side of snowmobile 9. This is illustrated by an arrow labeled W.

The inventor intends to show by this example that side-hilling, wherein slope 13 angles down to the right of user 11, is at least extremely difficult using snowmobile 9 as illustrated. A distance, illustrated herein by the letter D, represents the distance between the right and left hands of user 11 as placed on the appropriate controls of handlebar 15. This positioning is required during the maneuver for maintaining steering and propulsion. In this example, the position of throttle 17 limits the position of lean (L) that user 11 may achieve as evidenced by the full extension of the right arm of user 11.

User 11 cannot, in this example, attain enough lean (L) to effectively shift weight toward the uphill side of snowmobile 9 given the value of F which is a function of W and A, and the constraint of D. Angle B is at maximum value, meaning there is no effective uphill tilt to snowmobile 9. Hence, W remains concentrated at the down-slope ski. The value of C remains very small being restricted by D. Furthermore, the plane of steering for handlebar 15, defined as the plane in which handlebar 15 may be manipulated in a clockwise or counter-clockwise direction is still roughly parallel with slope 13 and lying at an obtuse angle away from user 11 (line L). Therefore, maintaining a slight uphill angle or even maintaining a lateral direction over slope 13 becomes extremely difficult if not impossible, at the least heavily taxing the strength of user 11.

Figure 2:
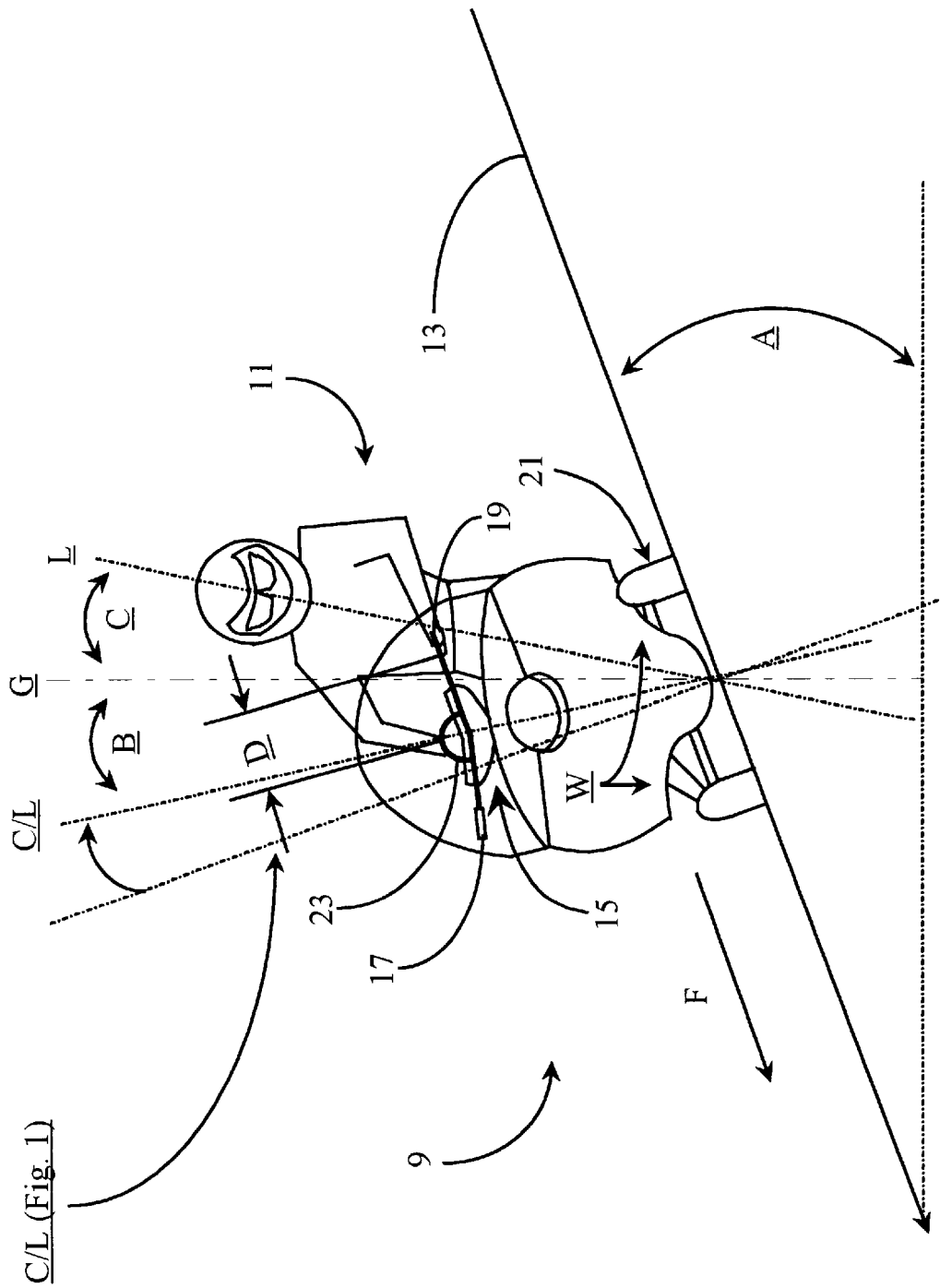
FIG. 2 is an overview of the side-hilling maneuver of FIG. 1 utilizing a rigid steering system adapted with a grab-bar according to prior art.

FIG. 2 is an overview of the side-hilling maneuver of FIG. 1 utilizing a rigid steering system adapted with a grab-bar according to prior art. This example represents a prior-art attempt at alleviating the challenges presented in FIG. 1. A grab-bar 23 is provided and positioned near the center of handlebar 15. Given the same conditions described in FIG. 1, bar 23 allows user 11 to obtain a greater lean (line L) in relation to line G as evidenced by a greater value illustrated for C. User 11 simply places his right hand (for this example) on bar 23 eliminating the former linear restriction D of FIG. 1. D in this example is effectively halved. However, throttle control 17 cannot be used in this example. Therefore, an additional throttle control must be provided on the uphill side of handlebar 15 in order for user 11 to gain any advantage by utilizing bar 23.

The extra capacity for lean allows user 11 to shift enough weight toward the uphill side of snowmobile 9 to effectively shift the vertical centerline (C/L) of snowmobile 9 such that the value of angle B is considerably lessened. The difference or tilt can be readily seen from the inclusion and comparison of the former C/L of FIG. 1 with the new C/L as illustrated in this example. A portion of W is successfully shifted from downhill ski 21 to uphill ski 21. Snowmobile 9 is now more adaptable to successful side-hilling, and less likely to roll over or turn downhill against the leverage applied by user 11.

Although this embodiment is an improvement over the situation illustrated in FIG. 1 in terms of obtaining a weight shift thereby reducing weight to ski 21 on the downhill side, there are still evident problems, some of which directly result from the geographic placement of and utilization of bar 23. Note that the linear value of D is now halved by virtue of the location of bar 23. As a direct result, user 11 now has less balance for stabilizing his or her stance on a side running-board, and less available torque for maintaining a steady steering position of handlebar 15. Both of the just-mentioned problems are caused by virtue the close-together hand placement required on handlebar 15 when utilizing bar 23. Moreover, the plane of steering for handlebar 15 has not changed much in relation to the line of slope 13 and still forms an obtuse angle away from user 11. Any advantage gained in angle by tilting snowmobile 9 toward the uphill side of slope 13 is lost by the increased lean value of C.

Figure 3:
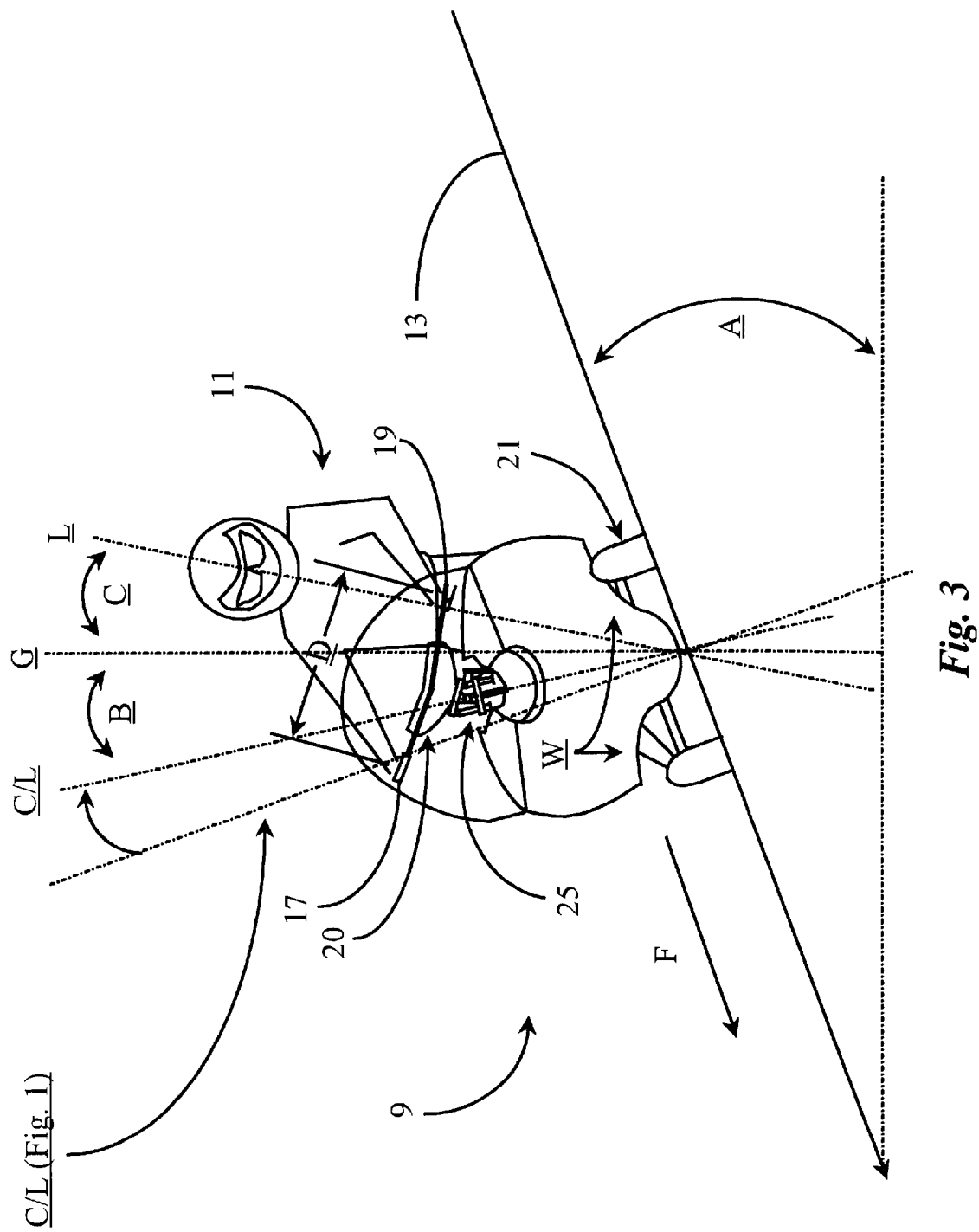
FIG. 3 is an overview of a rider doing a side-hilling maneuver using an angularly-adjustable steering system according to an embodiment of the present invention.

FIG. 3 is an overview of the side-hilling maneuver illustrated by FIG. 2 using an angularly-adjustable steering system according to an embodiment of the present invention. This example assumes the same conditions of the examples of FIGS. 1 and 2. Therefore, all pre-introduced components and elements that are not modified by the present invention or otherwise newly introduced retain the same element numbers used in the prior art examples. In a preferred embodiment of the present invention, the inventor provides an angularly-adjustable steering system. The adjustable steering system comprises a handlebar apparatus 20 and a bar-angling mechanism 25. The steering system is adapted to allow a user to gain much more maneuverability with less effort, strain and discomfort when side-hilling.

Handlebar apparatus 20 may be assumed to be identical to the handlebar of FIGS. 1 and 2 except for its integration with mechanism 25 and novel functionality afforded thereby. Mechanism 25, which can be seen through a broken-away portion of the front chassis of snowmobile 9, acts to allow user 11 to angularly adjust handlebar 20 to a desired and comfortable position using moderate force against a spring tension. After adjusting bar 20 to a desired position, user 11 may then cause handlebar 20 to remain locked in the desired position until it is no longer needed at that position. Unlocking bar 20 causes a return to a pre-adjustment neutral position, which is analogous to the rigid position of bar 15 as described in FIGS. 1 and 2. Unique mechanism 25 allows a bi-directional range of handlebar tilt along a vertical plane generally occupied by the T shape of handlebar apparatus 20.

In this example, the steering system allows user 11 to accomplish the goal of obtaining lean capability for weight-shifting purposes as described in FIG. 2 above, without requiring use of a grab-bar handle or an additional throttle control. In addition, the angling feature of the unique steering system allows distance D to remain maximal for sustaining superior balance and steering leverage.

It should be noted herein that values of C and B as well as positions L and C/L are not, in this example, illustrated as visibly differing from those values and positions described in FIG. 2. The goal of the present invention is not necessarily to enable greater lean capability or weight-transfer capability than is possible with a grab-bar handle However, maintaining a maximal D on handlebar 18 and angling the plane-of-steering toward user 11 such that it is considerably more acute, provides a much more natural and less taxing state for user 11 when performing a difficult side-hill maneuvers, and also makes using the throttle control easier. It can be seen by comparison and previous discussion that the embodiment illustrated herein is a definitive improvement over the examples of FIGS. 1 and 2. One with skill in the art will recognize that allowing bar 20 to be positioned at an angle toward the user, thereby enabling the user to maintain a wide hand placement while leaning toward the uphill side in a side-hilling maneuver works toward the benefit of the user and toward the success of the maneuver considering the previously discussed physics involved in executing such a maneuver.

In a preferred embodiment of the present invention, mechanism 25 is brake actuated by means of a lever and cabling system (not illustrated here) that operates one or more linear positioning locks affixed to mechanism 25. Various components of mechanism 25 including assembly options and methods of actuation are described below.

Figure 4:
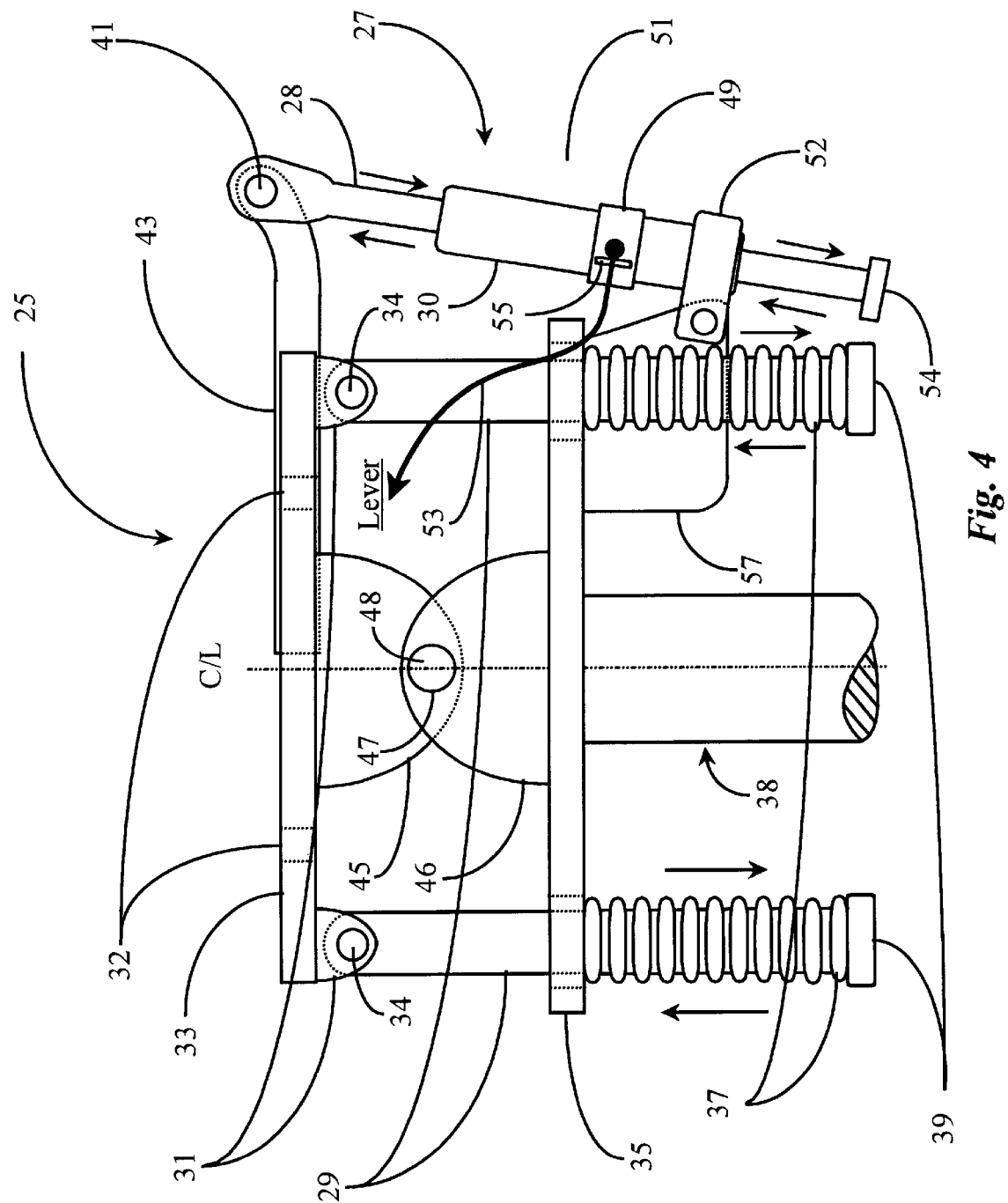
FIG. 4 is a front view of a modular bar-angling mechanism fitted to a snowmobile steering system according to an embodiment of the present invention.

FIG. 4 is a plan view of bar-angling mechanism 25 of FIG. 3 according to an embodiment of the present invention. Mechanism 25 is, in this example, a modular device that can be mounted in-between a stock T-style handle and a stock steering column common to a snowmobile or ATV. One with skill in the art of assembly will recognize that although only a plan view of mechanism 25 is provided for illustrative purposes, a perspective visualization of components and construction may be inferred from the following description.

An upper mounting plate 33 is provided and adapted as a mounting surface for a stock snowmobile or ATV handlebar apparatus. Plate 33 may be manufactured from durable steel, aluminum, or any other material capable of handling axial loads such as may be applied to the steering system of FIG. 3. Plate 33 is, in this example, rectangular in shape, but may take the form of other suitable shapes as may be desired for some implementations.

A plurality of openings 32 is provided to extend through the thickness of plate 33. In this example, there are four openings 32 (two visible) strategically located in plate 33 such that they form a rectangular bolt pattern for aligning with a similar arrangement of openings provided in the mounting surface of a stock handlebar. Openings 32 are of suitable inside diameter to accept the outer diameter of suitably strong bolts typically used for mounting handlebar apparatus to steering platforms in snowmobiles and in ATVs.

The under-surface of plate 33 supports four downward-extending, ribs (front two visible) located two each in symmetrically-aligned pairs with one pair existing at either end of plate 33. Each aligned pair is also strategically located in a centered arrangement on plate 33 such that they are asymmetrical to each other along the longitudinal centerline of plate 33 with the centerline extending between separate ribs of each pair. Each pair of ribs 31 is adapted as a pin-housing for pins 34, two of which are provided. Each pin 34 extends through one pair of ribs 31 with each pin supported by aligned openings placed through each pair of ribs such that pins 34, when mounted, assume a parallel relationship with each other and are equally spaced out from the under-surface of plate 33.

Ribs 31 may be formed of the same material as plate 33 such that plate 33 and ribs 31 are one solid piece. In another embodiment, ribs 31 may be attached to the under-surface of plate 33 by process of welding, bolting, or any other known method, which suitably withstands load strength.

Spacing between ribs 31 in a pair and individual thickness dimensions of each rib 31 are of suitable strength characteristics for forming a durable and resilient pin-housing. A fifth downward-extending rib 45, which is notably larger in dimension than ribs 31, is provided and supported on the under-surface of plate 33. Rib 45 is strategically located at a centered position on the under-surface of plate 33 such that it shares the same longitudinal centerline with plate 33 and has equal spacing from each adjoining outer edge of rib 45 to respective outer peripheral edges of plate 33.

Rib 45 as well as ribs 31 have a radial edge profile although this is not required for the practice of the present invention. Other shapes may be used. Rib 45 has an opening 47 provided therethrough at a strategic position along the vertical center of rib 45 and near to its radial edge. Opening 47 is adapted to accept a bolt or pin of a suitable diameter for handling load strength as described above with pins 34.

Mechanism 25 has a bottom plate 35, which is provided and adapted as a rectangular mounting-plate for mounting mechanism 25 to a steering column represented herein by element number 38. Plate 35 may be manufactured from steel or any other suitably durable material as described with plate 33 above. Similarly plate 35 may be of another shape instead of rectangular. In this example, the thickness of plates 33 and 35 are the same, approximately ⅜ of an inch. However, equality in plate thickness is optional as well as is the exact thickness used for each plate. Plates 33 and 35 should be of suitable thickness for withstanding load forces applicable to a steering system for a snowmobile or an ATV.

Plate 35 has an upward-extending rib 46 on its upper-surface. Rib 46 is strategically located along the longitudinal centerline of plate 35 at a position in front of and substantially parallel to rib 45 of plate 33. Rib 46 has an opening (47) provided there through, which is adapted for accepting the same bolt or pin described in conjunction with the opening (47) provided in rib 45, providing a pivotal attachment of ribs 45 and 46. Plate 33 is connected to plate 35 by aligning ribs 45 and 46 such that opening 47 is aligned and a pivot bolt or pin 48 may be inserted there through. The bolt or pin 48 is retained in opening 47 such that plate 33 may freely rotate about the axis formed by the inserted pin or bolt. Plate 35 is affixed to steering column 38 and is stationary with respect to the steering column.

Mechanism 25 further comprises two rods 29, which are adapted at one end to be retained by respective pins 34 inside respective pin-housings formed by ribs 31 of plate 33 by virtue of openings provided there through and adapted for the purpose. The above-described mountings are characterized in that rods 29, when mounted, may freely rotate at their respective ends around axes formed by pins 34. The method of rod retention inside pin-housings may vary according to design. For example, each rod 29 may be installed in its respective pin-housing after which pins 34 are welded into position. In another embodiment, pins 34 are retained in position by using durable snap-rings. There are many variant possibilities.

Each rod 29 is adapted to extend through plate 35 by virtue of provided openings (not detailed) placed through plate 35 and adapted for the purpose. In a preferred embodiment the openings are of a diameter larger than the diameter of rods 29 to allow for free movement. The openings are also somewhat elongated in a longitudinal direction for the purpose of facilitating some side-to-side movement of rods 29 during operation of mechanism 25. In an alternative embodiment ears 31 are slotted to allow lateral movement of pins 34 in operation.

The ends opposite the mounting ends of rods 29 are adapted with a means 39 for retaining a relatively heavy-gage spring 37 (one for each rod). Springs 37 are provided (one each) to be placed over rods 29 such that they seat between the under-surface of plate 35 and stopping shoulder 39 for each rod 29. The spring-retaining ends of each rod 29 may be threaded such that a hex-nut may be used as a stopping shoulder. In another embodiment, the spring-retaining ends of rods 29 are flanged (machined) to an appropriate diameter for spring retention under load. Rods 29 may be manufactured from durable steel or any other durable material suitable for handling load strength as described in conjunction with other mentioned components.

Springs 37 exhibit, by design, a state of moderate compression when seated in their positions with rods 29 mounted and ribs 45 and 46 connected. This causes plate 33 to assume a parallel relationship with plate 35 when there is no external load applied. Mechanism 25 is therefore a spring-loaded device wherein plate 33 may be caused to tilt axially around a retention bolt or pin (47) connecting ribs 45 and 46 in a bi-directional manner in response to a moderate axial load applied to plate 33. The integration of mechanism 25 into a stock steering system adds approximately two inches of height to the system in the preferred embodiment illustrated. The overall width of mechanism 25 is about four inches in this embodiment. Larger and smaller scale mechanisms 25 may be provided in other embodiments.

Mechanism 25 further comprises a locking apparatus 27 for locking at any desired angular position including a natural parallel-plate position assumed in the absence of axial force. In a preferred embodiment, apparatus 27 is a linear-positioning, locking device known as a Mechlok®. A Mechlok® is known in the art for attaining positive bi-directional, linear locking capability and is a mechanism commercially available. Locking device 27 comprises a tubular housing 30 through which a rod 28 may freely pass through when apparatus 27 is in an unlocked state.

A system of special bushings (not shown) are swaged against the inside wall of housing 30 and are positively engaged by locking springs (not shown) also installed inside housing 30. An actuation lever 55 acts to detension the locking springs allowing rod 28 to be freely movable in either linear direction. In practice, when actuation lever 55 is activated, the inner springs releases rod 28 allowing it to slide. When actuation lever 55 is released, the inner springs act to grip rod 28 locking it into position and preventing movement. More detail regarding locking device 27 is available from U.S. Pat. No. 4,577,730, which is incorporated herein by reference.

Locking device 27 is, in this example, physically adapted to act as a positive locking mechanism which is integrated into mechanism 25 and activated by a standard cable/lever mechanism (cable 53 illustrated) that may be mounted in a convenient position on a standard snowmobile or ATV handlebar apparatus. Plate 33 has an engagement arm 43 welded or otherwise affixed thereto with one end thereof extending substantially past the edge of plate 33 and adapted to be rotationally pinned to one end of rod 28.

As seen in this plan view, arm 43 is affixed to the rear longitudinal edge of plate 33 as a convenience only. Arm 43 may be affixed to the front edge of plate 33 or in another convenient location as long as it is sufficiently in line with rod 28 for connection purposes. In this example, both engaging ends of rod 28 and arm 43 are machined flat to facilitate insertion of a retaining pin 41 through provided openings in each end adapted for the purpose. Pin 41 may be retained with snap-rings or other known methods. Both ends (rod 28, arm 43) are illustrated as having radial edges extending peripherally around their respective pin openings. The provision of radial peripheral edges at the engaging ends of arm 43 and rod 28 represent a design preference only and are not required for function.

Locking device 27 is rigidly supported at plate 35 by virtue of a bracket 57, which may be welded or otherwise affixed to the rear longitudinal edge of plate 35. A ring bracket 52 is provided and welded or otherwise affixed to housing 30. An opening provided through both bracket 57 and through ring-bracket 52 provides a means for bolting the two brackets together pivotally thereby securing device 27 to plate 35. Other support methods may also be used in place of or in conjunction with bracketing 57 and 52. For example, a portion of plate 35 itself may be geographically reserved for housing device 27 with enclosure affected by virtue of a slotted opening adapted for enclosing device 27 therein at the diameter of housing 30. Once device 27 is positioned, using a shouldered screw to close the slot may flexibly tighten a slotted opening. Alternatively, device 27 may be secured in a provided opening via set-screws, which open into the inside diameter of the opening and are accessible from one or more edges of plate 35. The above-described method may be used in conjunction with bracketing to provide a secure attachment of device 27 to plate 35. There are many alternative possibilities. Mechanism 25 operates under condition of axial load applied to plate 33 by user-manipulation of an attached handlebar apparatus as is described further below.

Figure 5:
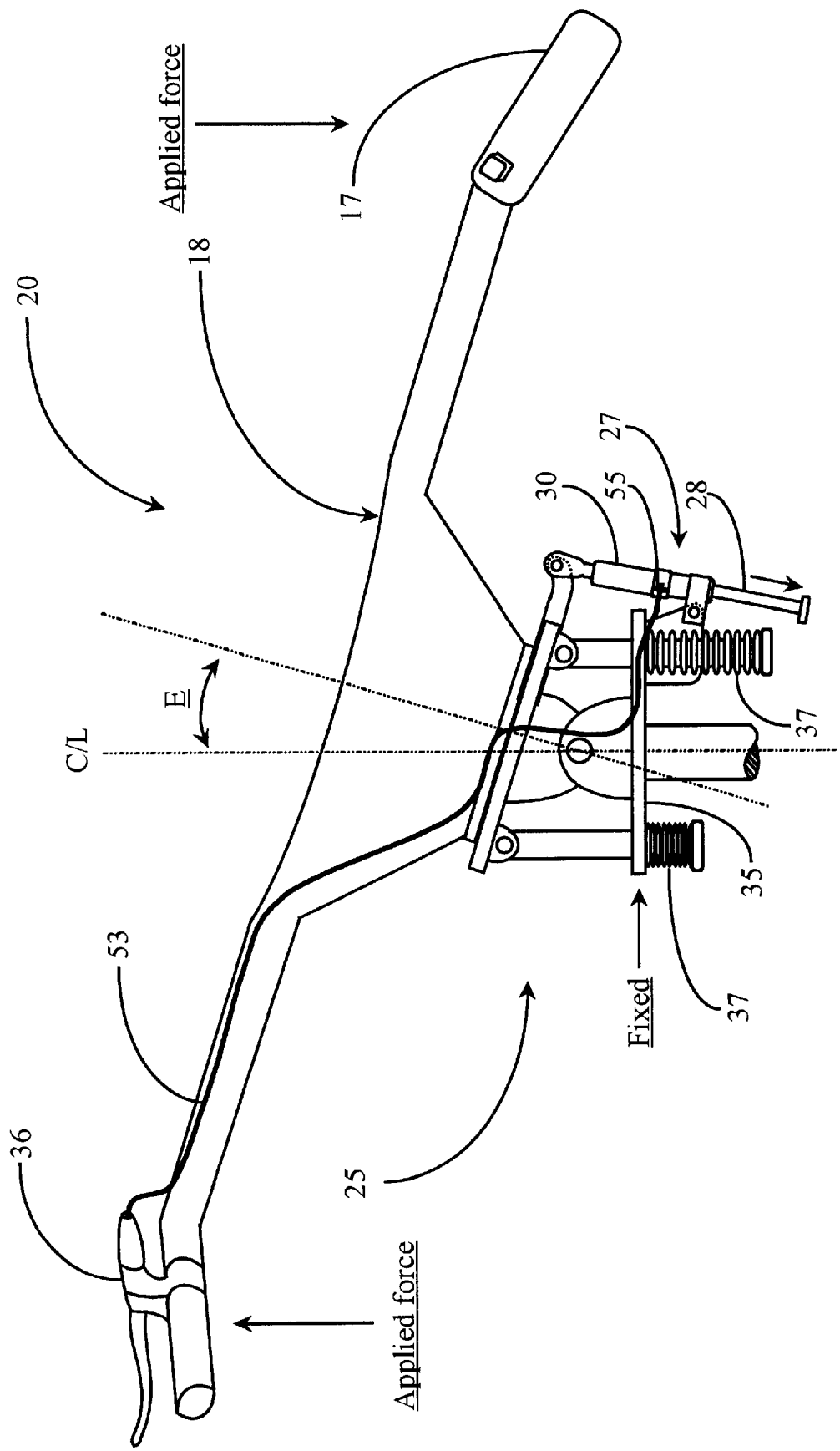
FIG. 5 is a rear view of a handlebar adjusted and locked in an angled position according to an embodiment of the present invention.

FIG. 5 is a plan view of steering system 20 of FIG. 3 locked in a state of angular adjustment according to an embodiment of the present invention. The steering system is illustrated as angularly adjusted in a clockwise direction to a specific angle E from centerline. The value of E is relative to the desired amount of tilt applied to steering system 20 before it is locked into place. In this example, E is approximately 20 degrees from vertical.

The inventor is aware that there needs be latitude for movement of elements of the steering mechanism that is not necessarily shown in this view, and allowances were described above. If rods 29 are affixed pivotally to plate 33 with slotted openings in ears 31, rods 29 may remain vertical as shown. If instead openings in lower plate 35 are elongated and rods 29 are pivoted to upper plate 33 without slots for lateral movement, rods 29 will assume a small angle with respect to plate 35. A combination of both may of course be used, or other design flexibility to allow the necessary movement.

In operation, a user operates a standard cable-lever 36, which in this example is mounted to handlebar 18 and connected via cable 53 to locking device 27, or more specifically, to actuation lever 55. Compressing lever 36 acts to unlock mechanism 25. A user then applies rotational force (illustrated by the couple labeled applied force) to tilt bar 18 to the desired position (angle E) while continuing to compress lever 36. By releasing cable-lever 36, device 27 is de-actuated and immediately locks bar 18 at the desired position quantified in this example by the value of angle E. The value of angle E may range from 0 to approximately 35 degrees on either side of vertical depending on the linear range of locking device 27 and associated rods 29, which may vary according to design.

As can be seen in this example, left spring 37 is nearly fully compressed against fixed bottom-plate 35 while right spring 37 is detensioned but still loaded against plate 35. It is noted herein that spring tension in a preferred embodiment is such that a spring cannot be fully detensioned during operation of the steering system. This eliminates the possibility of any unwanted free-play in the steering system Mechanism 25 may be designed to allow a greater angle of tilt than is illustrated herein, or it may be designed to restrict the steering system to a lesser angle of tilt. Preference will depend in part on snowmobile and or ATV design. As a modular apparatus, mechanism 25 may be fitted to any standard snowmobile or ATV steering system. In one embodiment, complete steering systems incorporating mechanism 25 may be provided to replace existing steering systems. In either case, a rubberized, flexible boot may be provided to wrap around mechanism 25 attaching to bar 18 and to lower column-housing structure for protecting the components of mechanism 25 against weathering.

It will be apparent to one with skill in the art that the steering system in embodiments of the invention exhibits functionality not available in prior art systems. The steering system according to embodiments of the invention provides a user with added capability and comfort when performing difficult angling maneuvers such as side-hilling or making sharp turns on a hill face. Safety benefits of the steering system include, but are not limited to, lessening the chances of vehicle rollover during side-hill maneuvers and increasing a user's balance capability on a running-board during such maneuvers.

Mechanism 25 may be provided in a variety of alternative designs without departing from the spirit and scope of the present invention. One such modification is detailed below.

Figure 6:
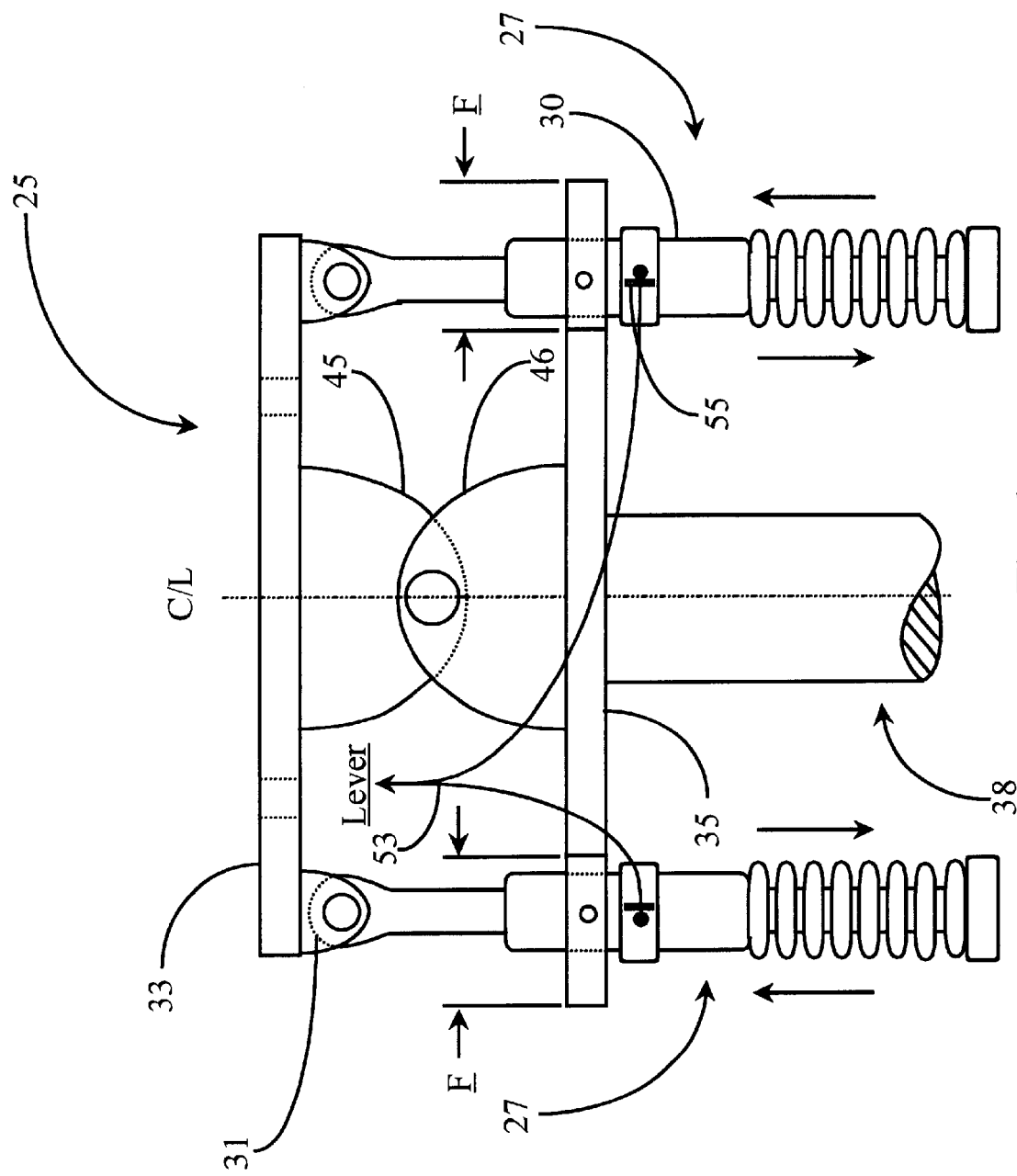
FIG. 6 is a front view of a modular bar-angling mechanism according to another embodiment of the present invention.

FIG. 6 is a plan view of a modular bar-angling mechanism according to another embodiment of the present invention. In this example, mechanism 25 has a similar configuration as was described in FIG. 4 with respect to the construction and motion-mechanics of top plate 33, bottom plate 35, ribs 31 and ribs 45 and 46. However, instead of using two spring-rods 29 in conjunction with one locking device (27) as detailed in FIG. 4, two locking devices 27 are substituted for rods 29, and springs 37 are implemented (one each) on devices 27.

In this case, bottom plate 35 is modified to accept locking devices 27 through openings provided therein for the purpose, with the housing of the locking devices pivotally mounted to plate 35. Four notches represented by distance F (one at each corner) represent areas of material removed from either side of each opening. Vertical slots (one per opening) are provided extending from the peripheral edges of plate 35 into each respective opening within which the housings of the locking devices are pivotally mounted.

A difference in operation between mechanism 25 of FIG. 5 and mechanism 25 of this embodiment exists in that one cable-lever as described in FIG. 5 controls a split-cable (53) that connects to both actuator levers (55). Therefore, compressing a cable/lever device simultaneously unlocks mechanism 25 for use. This embodiment provides a double-locking force for mechanism 25 and eliminates additional hardware and bracketing used in the embodiment of FIG. 4. In some embodiments one locking device may be used on one side, and a freely moving spring rod on the other.

In still other embodiments, other methods for achieving a bi-directional locking system for mechanism 25 may be devised without departing from the spirit and scope of the present invention. For example, instead of providing a linear locking device, a clutch activated, hydraulic, pressure-plate device may be provided for locking mechanism 25 at the central location of ribs 45 and 46. Such a device may be implemented such that when a user compresses a lever, hydraulic pressure is released from a cylinder unlocking mechanism 25 for use. Releasing the lever allows hydraulic pressure to re-build causing mechanism 25 to be re-locked at a desired position. Mechanical locking means such as providing a centrally located locking lever and threaded bolt mechanism may be used such that when a user applies rotational force to the lever, advancement of a threaded bolt acts to apply pressure to ribs 45 and 46 locking them together. Reversing force on the lever unlocks the mechanism. There are many variant possibilities.

Through empirical method, the inventor has found that a linear locking method made possible by utilization of one or more devices 27 provides extremely high load strength characteristics when in a locked position and requires little effort to activate and de-activate the locking means. Therefore, many preferred embodiments of the present invention include one or more linear locking devices as described in the above-illustrated embodiments, although in other preferred embodiments, locking devices may not be necessary.

The method and apparatus of the present invention provides an angularly-adjustable steering system which may be used with a snowmobile, an ATV, or other similar off-road vehicles utilizing cross-bar style steering handles. Such a system provides elements of comfort, maneuverability and safety, which are not available from current or prior art systems. Therefore, the method and apparatus of the present invention should be afforded the broadest possible scope under examination. The spirit and scope of the present invention is limited only by the claims that follow.

What is claimed is:

1. An angularly-adjustable steering system for a vehicle comprising:

a steering column connected to a lower steering member for enabling control of steering direction of the vehicle;

a handlebar apparatus for enabling user-applied direction for steering the vehicle; and a bar-angling mechanism for enabling angular adjustment of the handlebar apparatus, the bar-angling mechanism fixedly adjoined to the handlebar apparatus at one end, and fixedly adjoined to the steering column at the other end, such that a user gripping the handlebar apparatus may position the handlebar apparatus to a desired angle of tilt horizontally along the longitudinal axis of the vehicle by virtue of pivotal mechanics of the bar-angling mechanism.

2. The steering system of claim 1 wherein the vehicle is a snowmobile.

3. The steering system of claim 1 wherein the vehicle is an all-terrain vehicle (ATV).

4. The steering system of claim 1 wherein the bar-angling mechanism utilizes at least one bi-directional, linear locking device for locking and unlocking the position of the handlebar apparatus.

5. The steering system of claim 4 wherein the bar-angling mechanism is spring loaded and is unlocked and locked by operating an external control lever.

6. A mechanism for providing angular adjustment capability to a vehicle steering system comprising:

an upper mounting plate fixedly adjoined to a handlebar apparatus;

a lower mounting plate fixedly adjoined to a steering column;

a pivotal mount for connecting the upper mounting plate to the lower mounting plate;

at least one spring retention rod pivotally mounted to the upper mounting plate and supporting a spring compressed against the lower mounting plate and against the end of the rod.

7. The mechanism of claim 6 wherein free angular movement of the handlebar apparatus is resisted by spring compression.

8. The mechanism of claim 7 wherein the locking device is a bi-directional, linear locking device.

9. The mechanism of claim 8 wherein the linear locking device is lever actuated and controlled by an external, user-operated, cable-assisted lever.

* * * * *